March 22, 1960    D. MAGOWAN, JR    2,929,399
FLUID CHECK VALVE
Filed Oct. 26, 1956

INVENTOR.
DAVID MAGOWAN, JR.
BY
Christie, Parker & Hale
ATTORNEYS

United States Patent Office 2,929,399
Patented Mar. 22, 1960

2,929,399

FLUID CHECK VALVE

David Magowan, Jr., Encino, Calif.

Application October 26, 1956, Serial No. 618,600

1 Claim. (Cl. 137—513.7)

The invention relates to check valves and more particularly to check valves for use in conduits operating under high pressures.

Conventionally, pneumatic tools are operated at a distance from the source of pneumatic pressure. Flexible hose lines are used to connect between the source of pressure and the tool. If the line is opened either accidentally or intentionally, the jet effect of the freely issuing air from the line opening causes unpredictable and severe whipping of the line. Such whipping is dangerous to workers in the vicinity of the line.

I have invented a check valve for use in conjunction with pressurized lines which effectively cuts off the blast of air issuing from an opened line. The check valve of the invention may be placed in the line at any point between the source of fluid pressure and the tool but is preferably mounted at the source of pressure, say where the line emerges from an air compressor.

The invention comprises a valve body having a fluid inlet, a valve port and a fluid outlet arranged in series and adapted to fluid flow therethrough. Preferably, the inlet and outlet are adapted to accommodate standard line coupling devices. A spherical ball resides in the valve body between the inlet and the valve port. The ball is movable axially between the valve port and a stop means adjacent the inlet. A helically wound spring urges the ball against the stop.

The spring opposes the force of air flow or other fluid flow through the check valve. The spring tension is such that a pressure drop on the outlet side of the valve port permits the incoming fluid pressure to seat the ball in the valve port against the pressure of the spring. Such a pressure drop occurs when a line is broken or when a tool is disconnected from the delivery line. The fluid pressure then maintains the ball against the seat until the back pressure is restored to supplement the spring loading moving the ball away from the valve port and against the stop. After the line has been repaired or the tool replaced at the end of the line, back pressure is restored. By-pass means may be provided to leak a small amount of air or other fluid past the valve port to restore gradually the back pressure.

The invention provides economical means for increasing the safe usage of pneumatic tools. The preferred embodiment of the invention includes means for adjusting the spring tension within a given check valve to compensate for varying working pressures. Further advantages of the invention are explained in the following detailed description and drawings, in which.

Figure 1:
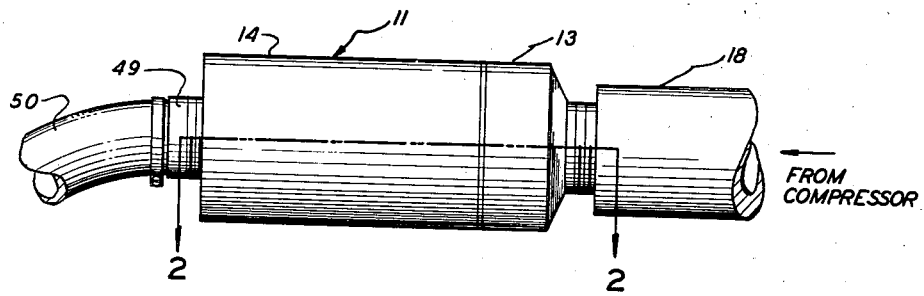
Fig. 1 is a plan view of a preferred embodiment of the invention.
Figure 2:
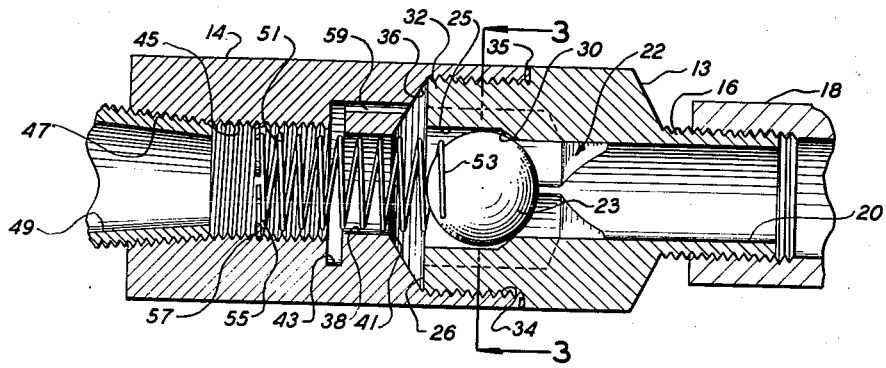
Fig. 2 is a sectional elevation taken on line 2—2 of Fig. 1.
Figure 3:
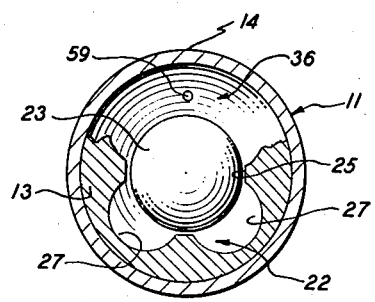
Fig. 3 is a transverse sectional elevation, partly broken away, and taken along line 3—3 of Fig. 2.

Figs. 1 through 3 illustrate a check valve 11 having a body composed of an inlet portion 13 and an outlet portion 14. The inlet portion has an externally threaded inlet nipple 16. A union 18 which may be connected to an air compressor (not shown) threadably engages the nipple. The nipple has a cylindrical bore 20 extending into the inlet portion and connecting with a valve chamber 22. A spherical check valve 23 resides in the valve chamber.

The valve chamber, whose configuration is best described in conjunction with Fig. 3, has a basic central bore 25 of slightly larger diameter than the check ball. The central bore extends inwardly from an end 26 of the inlet portion and tapers to a smaller diameter to join the cylindrical bore. The walls of the central bore are relieved by semi-cylindrical niches 27 disposed evenly about the periphery of the valve chamber. The niches are spaced so that an axial rib-like portion of the central bore remains between adjacent niches. Each niche extends from end 26 of the inlet body portion toward the cylindrical bore. The tapered portion of the central bore is discontinuous because of the relieving niches and forms a plurality of shoulders or stops 30 (see Fig. 2) against which the ball may seat.

The niches provide for fluid passage around the ball from the cylindrical inlet bore.

A reduced diameter portion 32 of the inlet body portion is externally threaded so that a large internally threaded bore 24 of the outlet body portion may be engaged therewith. A gasket 35 seals the joint between the two body portions. The threaded internal bore of the outlet body portion joins a conical chamber 36 which tapers inwardly toward the central axis of the valve and connects with a cylindrical passageway 38. The juncture of this passageway with the conical chamber forms an annular rim 41 which is the valve port of the check valve. The check ball seats against the rim or valve port in contact therewith when the valve is closed.

A counter-bore 43 is axially aligned with and adjacent to the passageway. The counter-bore and the passageway connect to a second threaded bore 45 which in turn connects with a tapered threaded bore 47 in which a line coupling 49 is threadably engaged.

When the valve is open fluid flows through the cylindrical inlet bore 20, the niches 27, the conical chamber 36, the passageway 38 and the second threaded bore 45 into the coupling 49 of a hose line 50. The check ball is impelled away from the valve port against the fluid flow by a helical spring 51 residing in the second threaded bore, the passageway, and the conical chamber. An end loop 53 of the spring thrusts against the check ball. An opposite end 55 of the spring rests on a base ring 57. The base ring is a C-washer threaded into the second threaded bore 45. The base ring, of course, must have a central opening so that fluid flow is not interrupted.

In operation the tension of the spring is set so that the ball remains seated against the stops in opposition to fluid flow through the inlet bore. The illustrated check valve has been tested in conjunction with flexible lines of ¾" inside diameter at 90 pounds per square inch gauge. At this pressure the pneumatic flow through the check valve was at the rate of 85 cubic feet per minute, not necessarily the upper flow limit.

The opening of the line downstream from the check valve permits a greater volume of air to flow through the check valve. The increased air flow overcomes the spring loading against the check ball and impels the ball into contact with the valve port. The flow of air through the opened line immediately ceases. There are no wild gyrations of the free end of the opened line to harm nearby workers or equipment.

The air pressure from the inlet of the check valve keeps the ball seated in the valve port as long as the line from the outlet of the valve is freely open to atmosphere. A by-pass 59 providing air passage between the chamber 36 and the counter-bore 43 around the valve port leaks air into the line. Therefore, when the line is closed, pressure gradually builds up in the line to supplement the spring load against the ball until the ball is urged upstream against the inlet pressure. The diameter of the by-pass should be approximately .105" under the operating conditions specified above. A by-pass of the specified diameter builds up a back pressure which re-sets the check ball against the stops in from 20 to 24 seconds. The re-set time may be changed by variation in the diameter of the by-pass.

Figure 4:
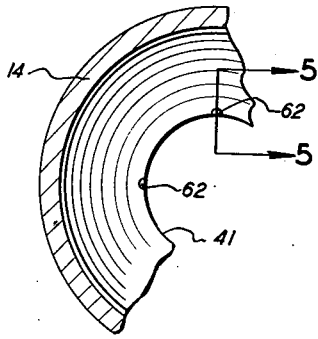
Fig. 4 is an interior fragmentary elevational view of the valve port of the check valve of Fig. 1.
Figure 5:
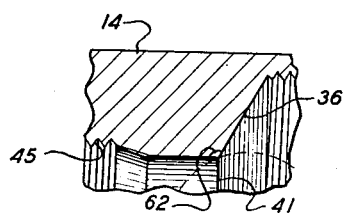
Fig. 5 is a fragmentary section taken along line 5—5 of Fig. 4.

Figs. 4 and 5 illustrate alternate means for by-passing the valve port. Parts identical to those in Figs. 1 through 3 have been given like numbers. One or more notches 62 are provided in the shoulder 41 of the valve port. The by-pass 59 is eliminated since the notches permit controlled leakage of air around the ball past the valve port. The size and number of the notches is determined by the re-set time desired under the instant operating conditions.

I claim:

A fluid check valve comprising a body having a fluid inlet and a fluid outlet, a valve port in the body, a check ball, a valve chamber within the body adapted to contain the check ball and to align the ball substantially axially with the valve port, the inlet and the valve chamber and the valve port and the outlet being serially connected for fluid flow therethrough, a compression spring extending through the valve port and urging the check ball away from the valve port, a plurality of stops integral with the body and peripherally spaced to project inwardly into the valve chamber between the valve port and the inlet, said stops defining a plurality of niches enabling flow around the check ball when the check ball is urged against the stops by the spring, a spring base threadably engaged in the outlet to be movable axially of the outlet to change the pressure of the spring against the check ball, the compression spring loading against the ball to urge the check ball against the stops until a preselected pressure differential overcomes the spring loading and seats the ball in the valve port, and a by-pass passage for the continuous passage of fluid between the fluid inlet and fluid outlet.

References Cited in the file of this patent

UNITED STATES PATENTS

| | | |
|---|---|---|
| 586,561 | Mosher | July 20, 1897 |
| 1,418,096 | Royer | May 30, 1922 |
| 1,788,358 | Georg | Jan. 6, 1931 |
| 2,100,627 | Bucy | Nov. 30, 1937 |
| 2,761,469 | Hansen | Sept. 4, 1956 |

FOREIGN PATENTS

| | | |
|---|---|---|
| 140,689 | Great Britain | Apr. 1, 1920 |
| 750,018 | France | May 15, 1933 |